United States Patent
Hiramine et al.

(10) Patent No.: US 9,899,890 B2
(45) Date of Patent: Feb. 20, 2018

(54) DRIVE DEVICE WITH HEAT SINK AND ANGLED MOTOR TERMINAL

(71) Applicant: DENSO CORPORATION, Kariya, Aichi-pref. (JP)

(72) Inventors: Mikihiro Hiramine, Nagoya (JP); Masashi Yamasaki, Obu (JP); Toshihiro Fujita, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 493 days.

(21) Appl. No.: 14/553,061

(22) Filed: Nov. 25, 2014

(65) Prior Publication Data

US 2015/0155763 A1 Jun. 4, 2015

(30) Foreign Application Priority Data

Nov. 29, 2013 (JP) .................................. 2013-247470

(51) Int. Cl.
*H02K 3/50* (2006.01)
*H02K 5/22* (2006.01)
(Continued)

(52) U.S. Cl.
CPC ............... *H02K 5/225* (2013.01); *H02K 3/50* (2013.01); *H02K 5/22* (2013.01); *H02K 11/048* (2013.01);
(Continued)

(58) Field of Classification Search
CPC .......... H02K 11/33; H02K 11/30; H02K 3/50; H02K 5/225; H02K 9/22; H02K 5/522;
(Continued)

(56) References Cited

U.S. PATENT DOCUMENTS

2010/0176696 A1* 7/2010 Mizutani ................ H02K 11/38
310/68 B
2010/0327679 A1 12/2010 Fujita et al.
(Continued)

FOREIGN PATENT DOCUMENTS

JP 2013-110779 6/2013

OTHER PUBLICATIONS

Office Action (4 pages) dated Sep. 24, 2015, issued in corresponding Japanese Application No. 2013-247470 and English translation (6 pages).
(Continued)

*Primary Examiner* — Bernard Rojas
*Assistant Examiner* — Alexander Singh
(74) *Attorney, Agent, or Firm* — Nixon & Vanderhye P.C.

(57) ABSTRACT

A driver device has a semiconductor module in which a motor terminal extends from a molded body and is connected to a motor wire. A heat sink of the driver device has a module mounting surface, which extends axially outward from an axial end of the motor section, on which the semiconductor module is fastened. The motor terminal includes a base region on a molded body side of a bend location and an extension region on a tip side of the bend location. The extension region has a connection portion on which an insertion hole receives the motor wire. A terminal angle between the extension region and a perpendicular line perpendicular to the motor wire is greater than zero degree. As such, the volume of the driver device is reduced.

10 Claims, 9 Drawing Sheets

(51) Int. Cl.
  *H02K 11/04*  (2016.01)
  *H02K 11/38*  (2016.01)
  *H02K 11/33*  (2016.01)

(52) U.S. Cl.
  CPC .............. *H02K 11/33* (2016.01); *H02K 11/38* (2016.01); *H02K 2213/03* (2013.01)

(58) Field of Classification Search
  CPC .......... H02K 3/522; H02K 5/15; H02K 11/38; H02K 11/048; H01L 23/49541
  USPC ........................................... 310/71, 68 R, 64
  See application file for complete search history.

(56) References Cited

U.S. PATENT DOCUMENTS

| | | | |
|---|---|---|---|
| 2010/0327709 A1* | 12/2010 | Minato | H05K 1/18 310/68 D |
| 2012/0098365 A1 | 4/2012 | Yamasaki et al. | |
| 2012/0286603 A1* | 11/2012 | Suga | H02K 11/33 310/71 |
| 2013/0099610 A1 | 4/2013 | Suga et al. | |
| 2013/0293335 A1 | 11/2013 | Yoshikawa et al. | |

OTHER PUBLICATIONS

Hiramine et al., U.S. Appl. No. 14/553,025, filed Nov. 25, 2014.
Miyachi, U.S. Appl. No. 14/553,090, filed Nov. 25, 2014.
Matsuo et al., U.S. Appl. No. 14/553,121, filed Nov. 25, 2014.
Tsuboi, U.S. Appl. No. 14/553,170, filed Nov. 25, 2014.

\* cited by examiner

CYCLE NUMBER N

MOTOR TERMINAL LENGTH

TILT DIRECTION OF POWER TERMINAL 46

DRIVE DEVICE WITH HEAT SINK AND ANGLED MOTOR TERMINAL

CROSS REFERENCE TO RELATED APPLICATION

The present application is based on and claims the benefit of priority of Japanese Patent Application No. 2013-247470, filed on Nov. 29, 2013, the disclosure of which is incorporated herein by reference.

TECHNICAL FIELD

The present disclosure generally relates to a driver device.

BACKGROUND INFORMATION

Conventionally, in a rotating electric machine having a motor and a controller in a single body, the controller may be positioned on an axial end of the machine, as shown in a patent document 1 (i.e., Japanese Patent No. JP-A-2011-177000). Further, a power module in such a rotating electric machine may be connected to a motor wire that extends out from a three-phase winding wire. The extending of the motor wire from the winding wire may be with or without a circuit board interposed therebetween.

In the patent document 1, the motor has a planar-shaped terminal that surface contacts the motor wire to allow welding or the like. However, during the welding process, the welded parts must be held by a jig or the like, which may lead to larger welded parts in order to provide somewhere on the welded parts for the jig to grab.

SUMMARY

It is an object of the present disclosure to provide a driver device having a small overall volume.

In an aspect of the present disclosure, a driver device includes a motor section, a motor wire, a semiconductor module, and a heat sink.

The motor section has a stator, a winding wire that is would on the stator, and a rotor that is rotatably disposed relative to the stator.

The motor wire extends out from the motor section from one axial end side of the motor section, and is connected to the winding wire.

The semiconductor module has a switching element, a molded body, and a motor terminal. The switching element switches an electric power supply to the winding wire. The molded body molds the switching element and has the switching element disposed therein. The motor terminal projects from the molded body, and is connected to the motor wire.

The heat sink is disposed on the axial end of the motor section from out of which the motor wire extends. The heat sink has a module mounting surface that extends in an axially outward direction from the axial end of the motor section. The semiconductor module is disposed on the module mounting surface.

The motor terminal includes (i) a base region on a molded body side of a bend location, and (ii) an extension region on a tip side of the bend location, the extension region having a connection portion with an insertion hole into which the motor wire is inserted. A terminal angle which is an angle between (a) a normal line of the motor wire and (b) the extension region of the motor terminal to which the motor wire is connected is larger than 0 degrees. In other words, the extension region of the motor terminal is angled relative to a perpendicular line that is perpendicular to the motor wire to form a terminal angle that is equal to or greater than zero degrees.

Also, in the present disclosure, when the terminal angle is set to be within a predetermined range, a projection area of the insertion hole along a motor wire extending direction is greater than a cross sectional area of the motor wire.

Further, in the present disclosure, the semiconductor module has a plurality of motor terminals. When a distance between (a) a protrusion position of a first motor terminal, among the a plurality of motor terminals, at which the first motor terminal protrudes from the molded body and (b) the motor wire that is connected to the first motor terminal is smaller than a distance between (c) a protrusion position of a second motor terminal at which the second motor terminal protrudes from the molded body and (d) the motor wire that is connected to the second motor terminal, the terminal angle of the first motor terminal is greater than the terminal angle of the second motor terminal.

Additionally, in the present disclosure, the connection portion is positioned on a concentric circle that is concentric to an outer shape of the motor section and centered on a rotational center axis of the motor section.

Even further, in the present disclosure, the semiconductor module is disposed on multiple sides of the heat sink, and the connection portions are symmetrically positioned around a rotational center axis of the motor section.

Still further, in the present disclosure, the module mounting surface is tilted with respect to a rotational center axis of the motor section.

Moreover, in the present disclosure, the module mounting surface is parallel with a rotational center axis of the motor section.

Yet further, in the present disclosure, the driver device also includes a board. The board is fixedly disposed on a side of the heat sink facing the motor section side or on a side of the heat sink facing away from the motor section side, and has a terminal connection hole into which a board terminal that extends from the molded body of the semiconductor module is inserted.

Also, in the present disclosure, the terminal connection hole is configured such that a dimension of the hole that is measured along a direction of tilt of the board terminal with respect to a rotational center axis (S) of the motor section is greater than a dimension of the hole measured along a direction that is perpendicular to the direction of tilt.

Moreover, in the present disclosure, the terminal connection hole has a circular shape.

Additionally, in the present disclosure, the board terminal has a bent portion that is bent to have a tip side of the terminal positioned on a heat sink side of the molded body.

In the present disclosure, since the motor wire is inserted into the insertion hole, and the motor wire and the motor terminal can be connected to each other with solder or the like, which saves a tool area for the use of a jig that is required for welding connection of those components, leading to a smaller volume of the driver device.

Further, by configuring a terminal angle to be greater than 0 degrees, the length of the motor terminal becomes large in comparison to a case in which the terminal angle is set to 0 degrees. In such manner, a connection part between the motor terminal and the motor wire has a smaller dislocation amount, which realizes a longer life thereof.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments of the present disclosure are described based on the drawings. In the following embodiments, like parts have like numbers for the brevity and not repeating the same description.

(First Embodiment)

The driver device in the first embodiment of the present disclosure is explained based on FIGS. 1-7. Drawings in FIGS. 1-7 are all illustrative and exemplary ones. The drawings in the second embodiment and after are also the same.

Figure 1:
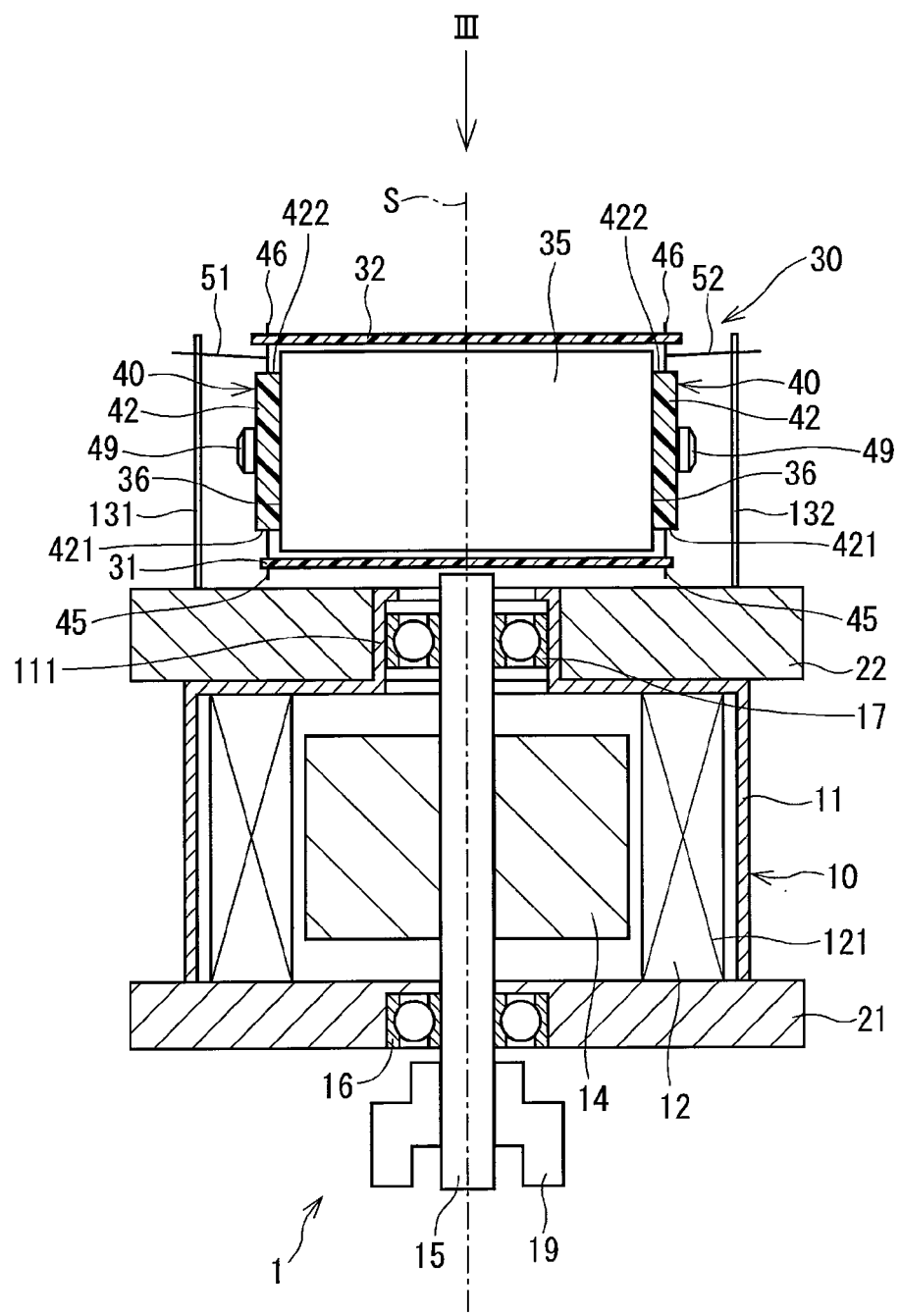
FIG. 1 is a sectional view of a driver device in a first embodiment of the present disclosure.

As shown in FIG. 1, a driver device 1 in the first embodiment of the present disclosure is applied, for example, to the electric power steering device of vehicles. The driver device 1 is provided with a motor 10 and a control unit 30. The driver device 1 of the present embodiment is formed as one body device accommodating the control unit 30 and the motor 10 in one body, disposing the control unit 30 on one axial end side of the motor 10.

The motor 10 includes a motor case 11, a stator 12, a rotor 14, a shaft 15, a first frame 21, a second frame 22 and the like. The motor 10 of the present embodiment is a three-phase brush-less motor.

The motor case 11 is formed substantially in a cylindrical shape, for example, with a material such as a soft magnetic material, e.g. iron.

The stator 12 has a winding wire 121 wound on a stator core that is fixed inside the motor case 11. The winding wire 121 constitutes a three-phase circuit with the winding wires of a U phase coil, a V phase coil, and a W phase coil. The winding wire 121 constitutes 2 sets of three-phase circuit in the present embodiment. From the winding wire 121, motor wires 131, 132, 133 (refer to FIG. 5) extends out from a control unit 30 side, and the wires 131, 132, 133 are connected to a semiconductor module 40.

The rotor 14 is substantially co-axially disposed with the stator 12, and is rotatable in a radial inside of the stator 12. The rotor 14 is formed substantially in a cylindrical shape, and has permanent magnets stuck on its peripheral surface so that an N pole and an S pole alternate in turns.

The shaft 15 is formed, for example, with metal, and is fixed to an axial center of the rotor 14. The shaft 15 is supported rotatably by bearings 16 and 17. In such manner, the shaft 15 rotates together with the rotor 14. In the present embodiment, an imaginary line extending from the axial center of the shaft 15 is designated as a "rotational center axis S of the motor 10."

The bearings 16, 17 are a ball bearing, respectively. The bearing 16 is fixed to the first frame 21. The bearing 17 is fixed to a bearing holder part 111 formed on the control unit 30 side of the motor case 11.

A joint 19 is formed on one side of the shaft 15 which is opposite to the control unit 30. The joint 19 outputs rotation of the rotor 14 and the shaft 15 to an exterior by engaging with a gear, etc., which is not illustrated. On one end of the shaft 15 close to the control unit 30, a magnet (not illustrated) is disposed.

The first frame 21 is formed substantially in a round tabular shape, and in disposed to cover an opposite end of the motor case 11, which is opposite to the control unit 30 side of the motor case 11. The bearing 16 is fixed substantially at the center of the first frame 21.

The second frame 22 is formed to have a corresponding shape to a heat sink 35, and is disposed on the control unit 30 side of the motor case 11.

The control unit 30 includes a controller board 31, a power board 32, the heat sink 35, the semiconductor module 40 and the like.

The controller board 31 is fixed to a motor 10 side of the heat sink 35. The controller board 31 has various electronic components of a control system that controls a comparatively small electric current, e.g., a microcomputer, a Hall IC, etc., mounted thereon. At a position on the board 31 facing the magnet on one end of the shaft 15, a rotational angle sensor for detecting rotation of the rotor 14 and the shaft 15 is disposed. Further, a controller terminal connection hole 311 (refer to FIG. 4) for inserting a later-mentioned controller terminal 45 is formed on the controller board 31.

The power board 32 has various electronic components of a power system that regulates a comparatively large electric current, e.g., a capacitor, a choke coil, etc. mounted thereon, and it is fixed to an opposite side of the heat sink 35 relative to the motor 10. The power board 32 has a power terminal connection hole 321 (refer to FIG. 5) for inserting a later-mentioned power terminal 46 formed thereon. The power terminal connection hole 321 of the present embodiment has a circular shape substantially. The controller terminal connection hole 311 also has the same shape.

The controller board 31 and the power board 32 are fixed to the heat sink 35 so that both of the boards 31, 32 are held in parallel with one axial end of the motor 10.

The heat sink 35 is made with a thermally conductive material, e.g., aluminum, and holds the controller board 31, the power board 32, and the semiconductor module 40.

Two module mounting surfaces 36 holding the semiconductor module 40 are formed on the heat sink 35. The module mounting surface 36 is formed substantially in parallel with each other on both sides of the heat sink 35, symmetrically to the rotational center axis S of the motor 10. In other words, the module mounting surface 36 rises from the one axial end part of the motor 10, substantially perpendicularly to such end part.

The semiconductor module 40 is screw-fastened to the module mounting surface 36 with a non-illustrated heat dissipation sheet with a screw 49. Thereby, the semiconductor module 40 is vertically positioned against the motor 10 (i.e., extending in an axially outward direction from the axial end of the motor 10). The heat sink 35 is fastened to the second frame 22 with a screw etc., having the controller board 31, the power board 32, and two semiconductor modules 40 fixed thereto.

The motor wires 131, 132, 133 are disposed on a radial outside of the semiconductor module 40. The motor wires 131, 132, 133 respectively have their tips extended to reach the power board 32. The motor wires 131, 132, 133 and the semiconductor module 40 are spaced from each other, and the motor wires 131, 132, 133 and the semiconductor module 40 are configured to contact with each other only at motor terminals 51, 52, 53.

Figure 2:
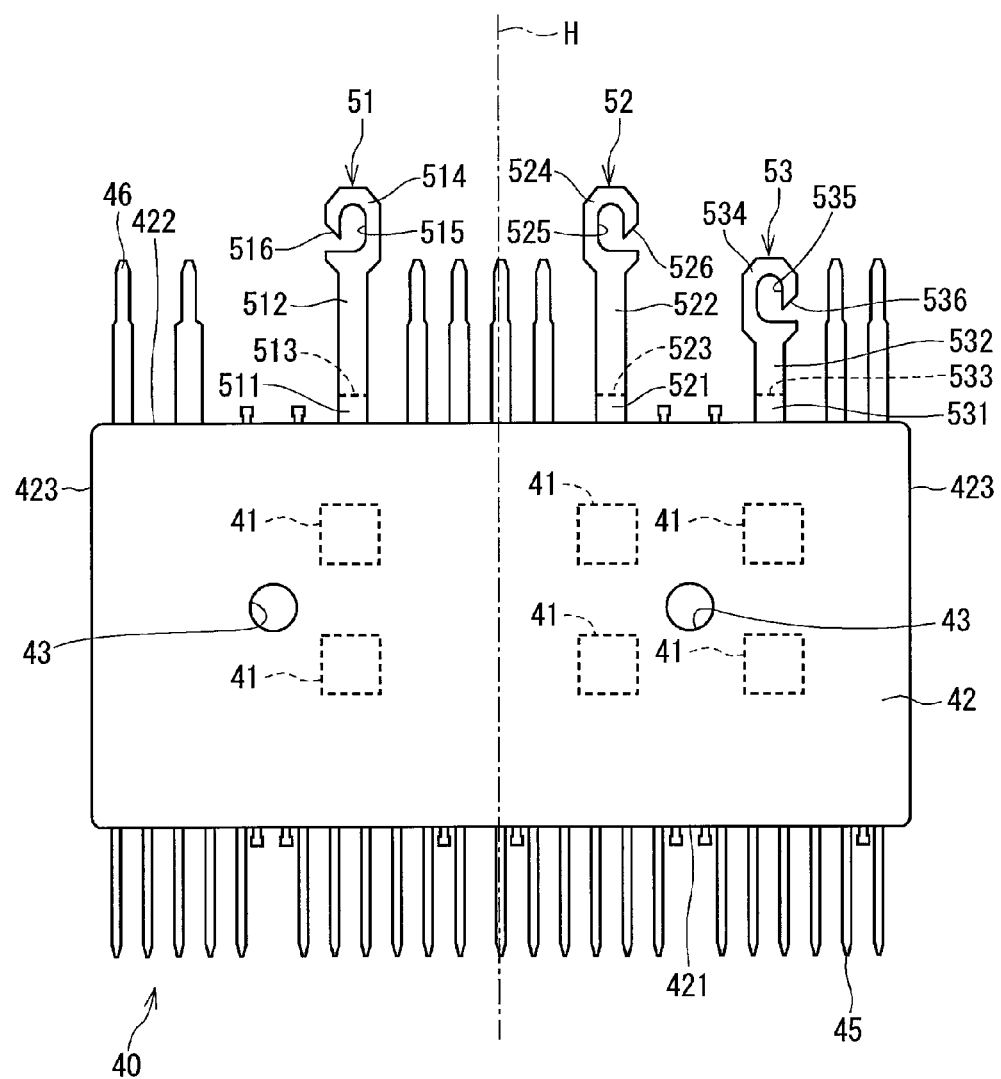
FIG. 2 is a plan view of a semiconductor module in the first embodiment of the present disclosure.

As shown in FIG. 2, the semiconductor module 40 has a switching element 41, the molded body 42, the controller terminal 45, the power terminal 46, and the motor terminals 51, 52, 53.

The switching element 41 is mounted on the lead frame that is made with an electrical conductive material such as a copper plate etc., which is not illustrated, and switches an electric power supply to each of the three phases of the winding wire 121.

The molded body 42 molds the six switching elements 41, each of which constitutes one inverter. In other words, the molded body 42 has the switching element disposed therein, which are together formed as a single body. On the molded body 42, a screw hole 43 for inserting in the screw 49 that fastens the semiconductor module 40 to the heat sink 35 is formed. As for the driver device 1 of the present embodiment, two semiconductor modules 40 are disposed thereon, and the driver device 1 is controlled by 2 sets of inverter.

Here, one face of the molded body 42 facing the motor 10 is designated as a first face 421, and other face of the molded body 42 facing away from the motor 10 is designated as a second face 422.

The controller terminal 45 protrudes from the first face 421 of the molded body 42. In other words, the controller terminal 45 protrudes toward the motor 10 from one side of the molded body 42. The controller terminal 45 is inserted into the controller terminal connection hole 311, and is connected to the controller board 31 with solder etc.

The power terminal 46 protrudes from the second face 422 of the molded body 42. The power terminal 46 is inserted into the power terminal connection hole 321, and is connected to the power board 32 with solder etc.

The motor terminals 51, 52, 53 are formed with the same material as the lead frame, and is nickel-plated. The motor terminals 51, 52, 53 are, just like the power terminal 46, protrudes from the second face 422 of the molded body 42. In other words, the power terminal 46 and the motor terminal 51 respectively protrude away from the motor 10 on an opposite side of the molded body 42. In the present embodiment, the power terminal 46 and the motor terminal 51 are disposed to protrude from a terminal protrusion position T (refer to FIG. 3), which is a predefined position along a thickness direction of the molded body 42.

The motor terminals 51, 52, 53 are bent away from the heat sink 35, i.e., a rising direction rising above a surface of the drawing in FIG. 2, and are respectively connected to the motor wires 131, 132, 133 with solder, etc., which are provided to correspond to each of the three phases of the winding wire 121. In the present embodiment, the motor terminal 51 and the motor wire 131 are connected, the motor terminal 52 and the motor wire 132 are connected, and the motor terminal 53 and the motor wire 133 are connected.

The motor terminal 51 is bent at a bend location 513, for a tip thereof to extend away from the heat sink 35. Here, dividing the motor terminal 51 into two parts, a molded body 42 side of the bend location 513 is designated as a base region 511, and a tip side of the bend location 513 is designated as an extension region 512.

The base region 511 protrudes substantially perpendicularly from the second face 422 of the molded body 42.

At a tip of the extension region 512, a connection portion 514 connected to the motor wire 131 is formed. The connection portion 514 has an insertion hole 515 into which the motor wire 131 is inserted. When the motor wire 131 is inserted into the insertion hole 515, the motor wire 131 and the motor terminal 51 are connected with solder etc. Thereby, the semiconductor module 40 and the winding wire 121 are electrically connected.

Figure 3:
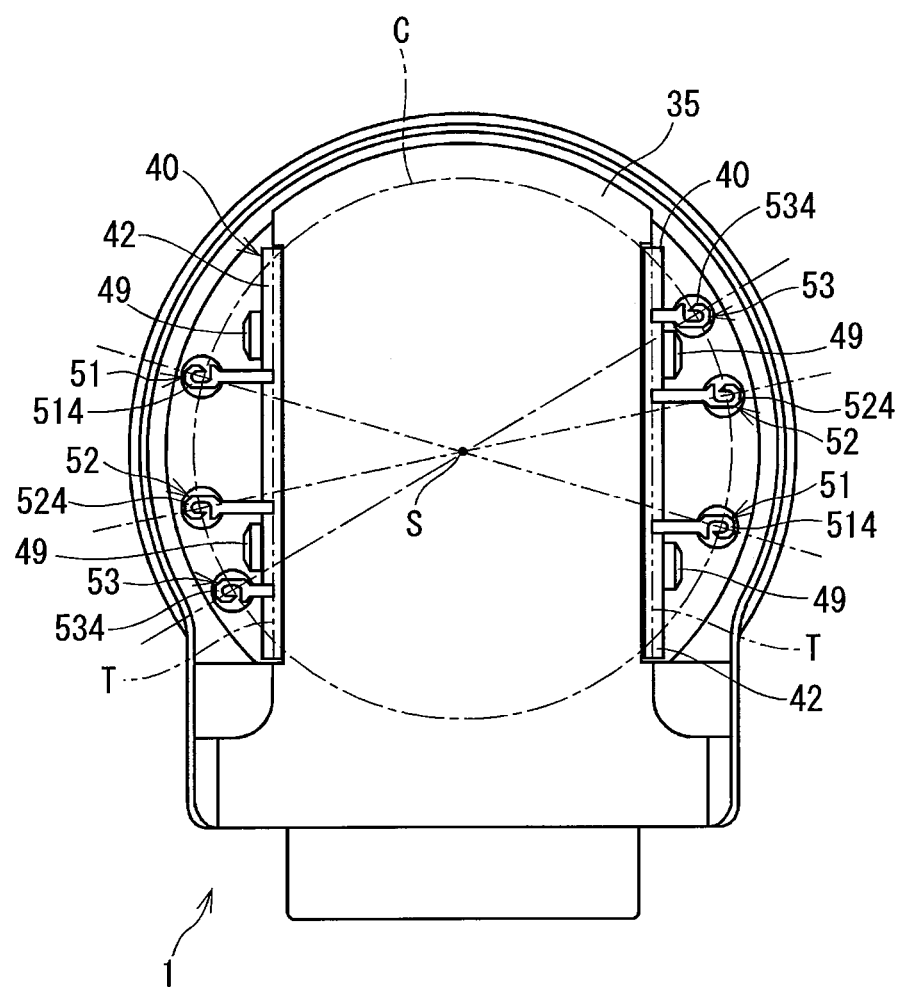
FIG. 3 is a plan view of the driver device in the first embodiment of the present disclosure.

The connection portion 514 has a notch 516 formed thereon. When we define a center line H at a center of the long side of the molded body 42, as shown in FIG. 3, a portion of the molded body 42 around the center line H may be called as an "inside" and a portion of the molded body 42 away from the center line H toward a side face 423 may be called as an "outside." Based on such naming, the notch 516 is formed on the outside (of the motor terminal 51). By forming the notch 516, a surface tension of the melted solder just after lifting the motor terminal 51 from the solder bath or the like, i.e., just after a dip/coat process, is readily broken, which prevents the solder from remaining in the insertion hole 515.

Other than the right-left reversed orientation, the motor terminal 52 has the same shape as the motor terminal 51, that is, the motor terminal 52 is bent at a bend location 523, to have a base region 521 and an extension region 522. At a tip of the extension region 522, a connection portion 524 is formed, and the connection portion 524 has an insertion hole 525 into which the motor wire 132 is inserted. Further, the connection portion 524 has a notch 526 formed thereon.

Other than that the length of an extension region 532 is shorter than the extension region 522, the motor terminal 53 has the same shape as the motor terminal 52, that is, comprises a base region 531 and an extension region 532, and is bent at a bend location 533. At a tip of the extension region 534, a connection portion 534 is formed, which has an insertion hole 535 into which the motor wire 133 is inserted. Further, the connection portion 534 has a notch 536 formed thereon.

As shown in FIG. 3, since the semiconductor modules 40 of identical shape are disposed on both sides of the heat sink 35 in the present embodiment, the connection portions 514, 524, 534 are point-symmetric with respect to the rotational center axis S of the motor 10. In such manner, as compared with a case in which the semiconductor modules 40 on both sides have different shapes, the number of parts is reduced as a result of using the same parts.

Further, the connection portions 514, 524, 534 are positioned on a concentric circle C that is centered on the rotational center axis S of the motor 10 and concentric to the outer shape of the motor 10. In the present embodiment, when a part of each of the connection portions 514, 524, 534 is positioned at least on the concentric circle C, it is considered as being positioned on the concentric circle C. In addition, a part of the insertion hole 515 is preferably positioned at least on the concentric circle C. In such manner, since the stator 12 that substantially has a circular shape on which the winding wire 121 is wound and the motor wires 131, 132, 133 respectively extend therefrom, a connection between the motor terminal 51 and each of the motor wires 131, 132, 133 is made easy.

Further, in FIG. 3, the power board 32 as well as the motor wires 131, 132, 133, and the power terminal 46 are omitted from the drawing. Further, in FIG. 3, the heat sink 35 is drawn only as an outline.

Figure 4:
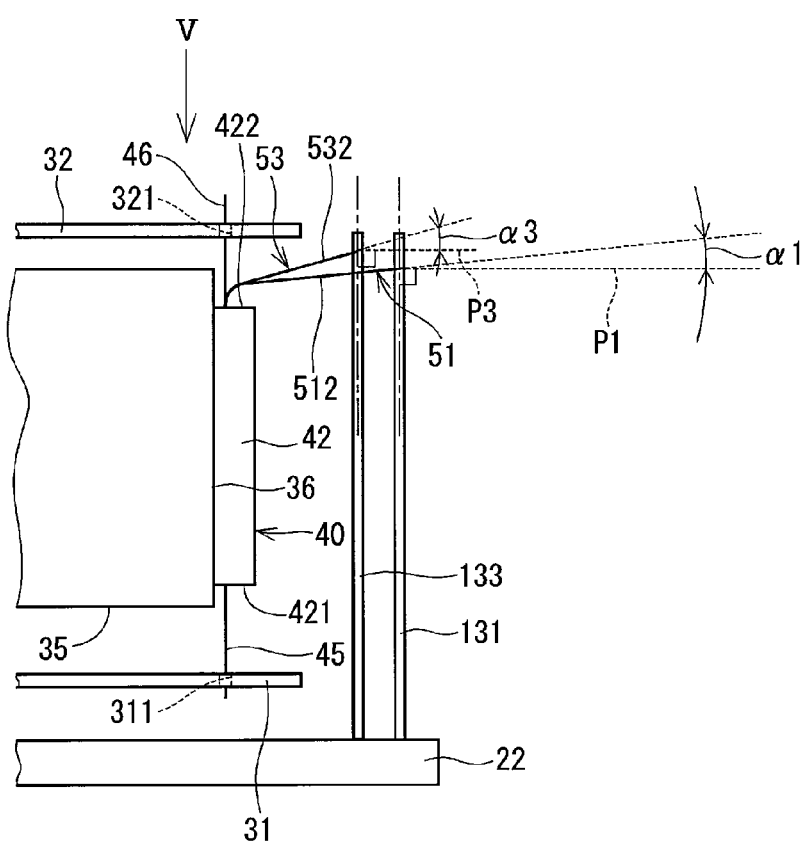
FIG. 4 is a side view of a connecting position of a motor terminal and a motor wire in the first embodiment of the present disclosure.
Figure 5:
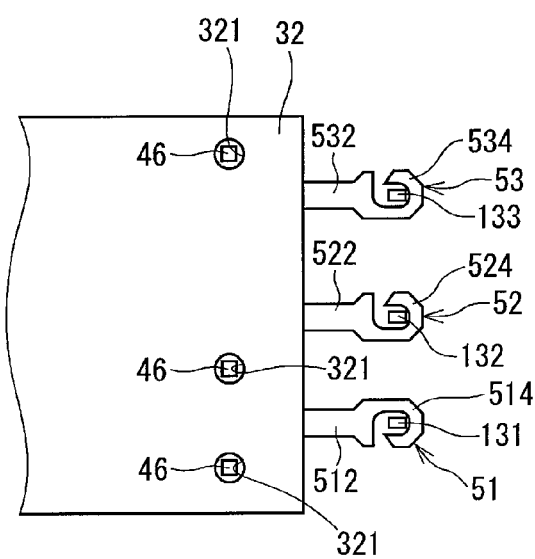
FIG. 5 is an illustration of a view along an arrow V direction in FIG. 4.

FIGS. 4 and 5 illustrate how the motor wires 131, 132, 133 and the motor terminals 51, 52, 53 are arranged and connected. In FIG. 4, the motor 10, the motor terminal 52, and the motor wire 132 are omitted from the drawing together with other parts. In FIG. 5, for the ease of viewing and understanding, the length of the motor terminals 51, 52, 53 and the interval between terminals are unified. Further, a part of the power terminal 46 and a part of the power terminal connection hole 321 are simplified. The simplification of FIGS. 4 and 5 described above also applies to the corresponding drawings in other embodiments.

As shown in FIG. 4, a terminal angle α1 which is an angle between of a normal line P1 of the motor wire 131 and the extension region 512 of the motor terminal 51 is set to be greater than 0 degrees in the present embodiment. Thereby, as compared with a case where the terminal angle α1 is set to 0 degrees, the length of the motor terminal 51 becomes large. That is, the length of the motor terminal 51 increases when the terminal angle α1 widens. However, when the terminal angle α1 widens, a projection area size of the insertion hole 515 along the motor wire 131 which is a size of a projected insertion hole 515 in the motor wire 131 becomes small. If an entire cross section of the motor wire 131 is not included in the projection area of the insertion hole 515, it would be difficult for the motor wire 131 to be inserted into the insertion hole 515. Therefore, in the present embodiment, the terminal angle α1 is set to be within a predetermined range that allows the projection area of the insertion hole 515 along the motor wire 131 direction to entirely cover the cross section of the motor wire 131. Therefore, the terminal angle α1 can be set up according to the shape of the insertion hole 515, and according to a cross section shape of the motor wire 131.

Similarly, a terminal angle α2 (not illustrated) which is an angle between the normal line of the motor wire 132 and the extension region 522 of the motor terminal 52 to is set to be greater than 0 degrees. In the present embodiment, α1 is equal to α2.

Further, a terminal angle α3 which is an angle between a normal line P3 of the motor wire 133 and the extension region 532 of the motor terminal 53 is set to be greater than 0 degrees. In the present embodiment, α3>α1 and α3>α2.

Hereafter, the motor terminal 51 and the motor wire 131 are used as an example of stress management at the connection position between the motor terminals 51, 52, 53 and the motor wires 131, 132, 133.

In the present embodiment, the motor terminal 51 of the semiconductor module 40 that is fastened to the heat sink 35, which is made with aluminum etc., and the motor wire 131 extending out from the motor case 11, which is made with iron, etc., are connected with solder. When the heat sink 35 and the motor case 11 are made with different materials having different linear expansion coefficients, different amounts of expansion of those different materials cause stress at the connection position of the motor terminal 51 and the motor wire 131, i.e., a heat-cold energy stress concentrates on the connection position (henceforth a "solder-joint part").

According to the Coffin-Manson rule about a low cycle fatigue, an equation (1) is applicable to a relationship between a dislocation amount Δε of the solder-joint part and a cycle number N that finally breaks the solder-joint part.

In the equation (1), both of j and k are positive constants.

$$N = j \times \Delta\epsilon^{-k} \quad (1)$$

Figure 6:
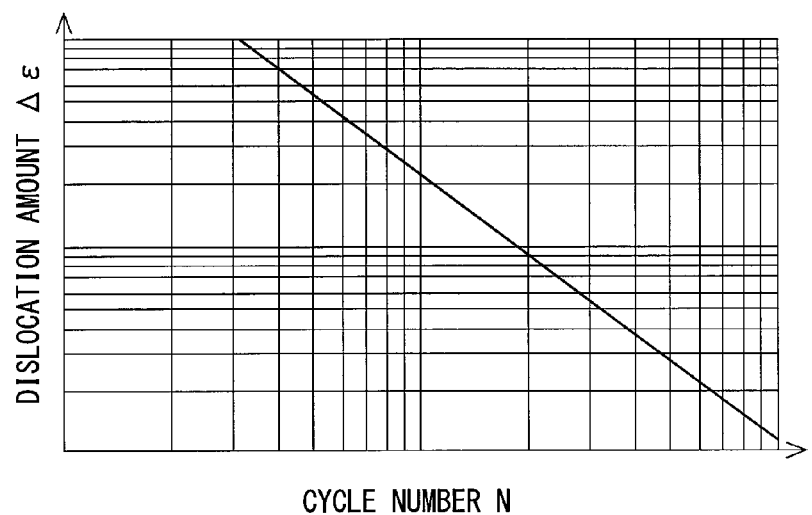
FIG. 6 is a relationship diagram about a relation between a number of cycles and a dislocation amount.

As shown in the equation (1) and FIG. 6, the cycle number N before the breakage decreases as the dislocation amount Δε of the solder-joint part increases. That is, the life of the solder-joint part shortens.

Figure 7:
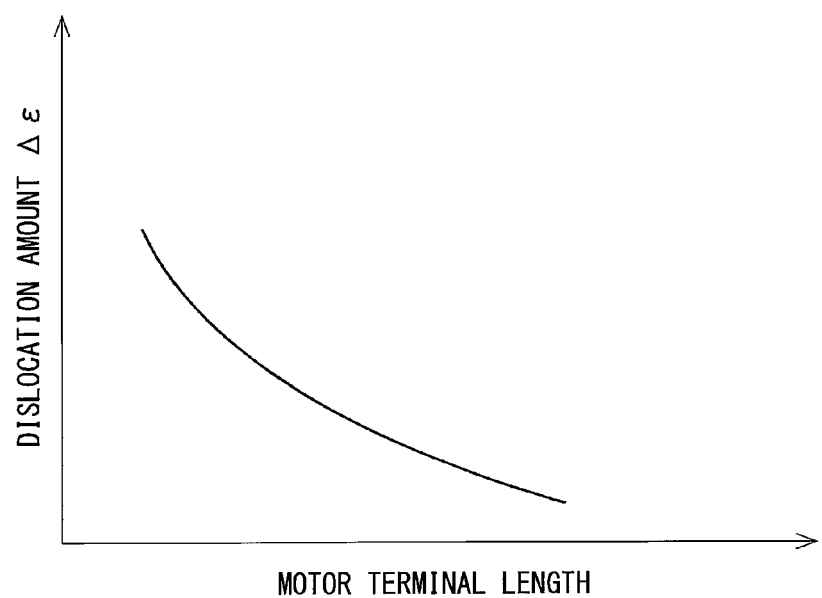
FIG. 7 is a relationship diagram about a relation between a length of an extension region and the dislocation amount.

Further, a relationship between the dislocation amount Δε of the solder-joint part and the length of the motor terminal 51 is shown in FIG. 7. As shown in FIG. 7, when the length of the motor terminal 51 increases, the dislocation amount Δε of the solder-joint part decreases. Therefore, since the cycle number N before the breakage of the solder-joint part increases when the length of the motor terminal 51 increases, the solder-joint part obtains a longer life span.

Therefore, in the present embodiment, the terminal angle α1 which is an angle between the normal line P of the motor wire 131 and the extension region 512 of the motor terminal 51 is set to be greater than 0 degrees for the reservation of the length of the motor terminal 51, as shown in FIG. 4. Similarly, the terminal angle α2 which is an angle between the normal line of the motor wire 132 and the extension region 522 of the motor terminal 52 and the terminal angle α3 which is an angle between the normal line of the motor wire 133 and the extension region 532 of the motor terminal 53 are respectively set to be greater than 0 degrees.

According to the requirement/specification of a product, the cycle number N (i.e., the cycle number required for a product is hereafter designated as a "connection life span") is determined, and the dislocation amount Δε of the solder-joint part is determined from the equation (1). Then, the length of each of the motor terminals 51, 52, 53 is determined from the dislocation amount Δε of the solder-joint part from FIG. 7. Thus, and according to the length of each of the motor terminals 51, 52, 53, the terminal angles α1, α2, α3 are respectively set up.

By setting the terminal angles α1, α2, α3 to be greater than 0 degrees, and by arranging the extension regions 512, 522, 532 to have an angle against the motor wires 131, 132, 133, the length of each of the motor terminals 51, 52, 53 is set to have an appropriate/desired size according to the connection life span, without increasing a diameter size of the motor 10.

Here, the positional relationship between the motor terminals 51, 52, 53 and the motor wires 131, 132, 133 is described based on FIG. 3. In FIG. 3, although the motor wires 131, 132, 133 are not illustrated, it is considered that those wires 131, 132, 133 are positioned on the circle C, since the motor wires 131, 132, 133 are inserted into the insertion holes 515, 525, 535 of the connection portions 514, 524, 534.

As shown in FIG. 3, the distance between the terminal protrusion position T of the motor terminal 53 and the motor wire 133 is short as compared with the respective distances between the terminal protrusion positions T of the motor terminals 51 and 52 and the motor wires 131 and 132.

Thus, as shown in FIG. 4, the terminal angle α3 between the extension region 532 of the motor terminal 53 and the normal line of the motor wire 133 may be set to be greater than the respectively terminal angles α1, α2 between (i) the extension regions 512 and 522 of the motor terminals 51 and 52 and (ii) the normal lines of the motor wires 131 and 132. Thereby, the length of the extension region 532 can be increased As described in full details above, the driver device 1 of the present embodiment has the motor 10, the motor wires 131, 132, 133, the semiconductor module 40, and the heat sink 35.

The motor 10 has the stator 12, the winding wire 121 wound on the stator 12, and the rotor 14 rotatably disposed in the stator 12. The motor wires 131, 132, 133 which are connected to the winding wire 121 extend out from one axial end of the motor 10.

The semiconductor module 40 has the switching element 41, the molded body 42, and the motor terminals 51, 52, 53. The switching element 41 switches an electric power supply to the winding wire 121. The molded body 42 molds the switching element 41. In other words, the molded body 42 has the switching element disposed therein. The motor terminals 51, 52, 53 protrude from the molded body 42, and are connected to the motor wires 131, 132, 133.

The heat sink 35 has the module mounting surface 36, and is disposed on one side of the motor 10, from which the motor wires 131, 132, 133 of the motor 10 extend. The module mounting surface 36 rises from the one axial end of the motor 10, and the semiconductor module 40 is fixed thereon. In other words, the module mounting surface 36 extends in an axially outward direction from the axial end of the motor 10. Thereby, the semiconductor module 40 is vertically positioned against the motor 10.

The motor terminal 51 comprises the base region 511 on the molded body 42 side of the bend location 513 and the extension region 512 on the tip side of the bend location 513 including the connection portion 514 that has the insertion hole 515 into which the motor wire 131 is inserted.

The motor terminal 52 comprises the base region 521 on the molded body 42 side of the bend location 523 and the extension region 522 on the tip side of the bend location 523 including the connection portion 524 that is connected to the motor wire 132.

The motor terminal 53 comprises the base region 531 on the molded body 42 side of the bend location 533 and the extension region 532 on the tip side of the bend location 533 including the connection portion 534 that is connected to the motor wire 133.

Since the motor wires 131, 132, 133 are inserted into the insertion holes and the motor wires 131, 132, 133 and the motor terminals 51, 52, 53 are connected with solder etc. in the present embodiment, a tool area for using the jig for welding the wire and the terminal is saved, which realizes a small volume of the driver device.

The terminal angles α1, α2, α3 which are respectively angles between the normal lines of the motor wires 131, 132, 133 and the extension regions 512, 522, 532 are set to be greater than 0 degrees. In such manner, as compared with the case where the terminal angle is set to 0 degrees, the lengths of the extension regions 512, 522, 532 increase. Thus, since the dislocation amount Δε of the solder-joint part decreases by such setting, a connection life span of the solder-joint part becomes long. Further, for the same connection life span, the volume of the driver device 1, i.e., especially a diameter of the apparatus 1, can be reduced in comparison to the case where the terminal angle is set to 0 degrees.

The insertion hole 515 into which the motor wire 131 is inserted formed on the connection portion 514. The insertion hole 525 in which the motor wire 132 is inserted is formed on the connection portion 524. The insertion hole 535 in which the motor wire 133 is inserted is formed on the connection portion 524.

Here, if the terminal angles α1, α2, α3 are respectively increased, the projection area size of the insertion holes 515, 525, 535 along the direction of the motor wires 131, 132, 133 will decrease. Therefore, in the present embodiment, the terminal angles α1, α2, α3 are set to be within an predetermined range that allows the entire cross sections of the motor wires 131, 132, 133 to be included in the projection area of the insertion holes 515, 525, 535 along the motor wire directions, i.e., along the wires 131, 132, 133. Thereby, the motor wires 131, 132, 133 are respectively easily insertable into the insertion holes 515, 525, 535.

The semiconductor module 40 has the multiple motor terminals 51, 52, 53.

The distance between the motor terminal 53 and the motor wire 133, i.e., between the protrusion position of the terminal 53 from the molded body 42 and the motor wire 133, is shorter than the distances between the other two, i.e., the distances between the motor wires 131, 132 and the motor terminals 51, 52. In such a case, the terminal angle α3 concerning the motor terminal 53 is greater than the terminal angles α1, α2 concerning the motor terminals 51 and 52. Thereby, even when the motor wire 133 is close to the semiconductor module 40 and the distance between the molded body 42 and the motor wire 133 is short, the extension region 532 may be configured to have a suitable length according to the required connection life span.

The connection portions 514, 524, 534 are positioned on the concentric circle C that centers on the rotational center axis S of the motor 10 when seen from the above, i.e., from one axial end, of the motor 10. In such manner, when the motor wires 131, 132, 133 are perpendicularly/vertically taken out from the winding wire 121 which is wound on the stator 12 having a circular shape, for example, a connection work for connecting the motor wires 131, 132, 133 and the semiconductor module 40 is made easy. Further, the volume, i.e., a diameter size, of the driver device 1 is reduced.

Further, the positions of the connection portions 514, 524, 534 along the motor axis may be the same, or may vary.

Two semiconductor modules 40 are disposed on both sides of the heat sink 35. The connection portions 514, 524, 534 are positioned at point-symmetric to the rotational center axis S of the motor 10. In other words, the connection portions 514, 524, 534 are symmetrically positioned around a rotational center axis of the motor 10. In such manner, the same-shaped semiconductor modules 40 can be used for the reduction of the number of parts.

The module mounting surfaces 36 are formed in parallel with the rotational center axis S of the motor 10. Thereby, the volume in the diameter direction of the driver device 1 can be reduced.

The driver device 1 has the controller board 31, which is fixed on the motor 10 side of the heat sink 35 and on which the controller terminal connection hole 311 is formed for inserting the controller terminal 45 which protrudes from the molded body 42 of the semiconductor module 40.

Further, the driver device 1 has the power board 32, which is fixed on an opposite side of the heat sink 35 relative to the motor 10 and on which the power terminal connection hole 321 is formed for inserting the power terminal 46 which protrudes from the molded body 42 of the semiconductor module 40.

In the present embodiment, the controller terminal connection hole 311 and the power terminal connection hole 321 are respectively formed in a circular shape. Thereby, as compared, for example, with the case where the controller terminal connection hole 311 and the power terminal connection hole 321 are respectively formed in an elliptical shape, the controller board 31 and the power board 32 can be made smaller, which enables the volume reduction of the entire apparatus 1.

The controller terminal 45 and the power terminal 46 correspond to a "board terminal", the controller board 31 and the power board 32 correspond to a "board", and the controller terminal connection hole 311 and the power terminal connection hole 321 correspond to a "terminal connection hole" in the claims. Further, the motor terminal 53 corresponds to a "first motor terminal", and the motor terminals 51 and 52 correspond to a "second motor terminal." Further, the terminal angle α3 corresponds to a "terminal angle of the first motor terminal", and the terminal angles α1 and α2 correspond to a "terminal angle of the second motor terminal."

(Second Embodiment)

Figure 8:
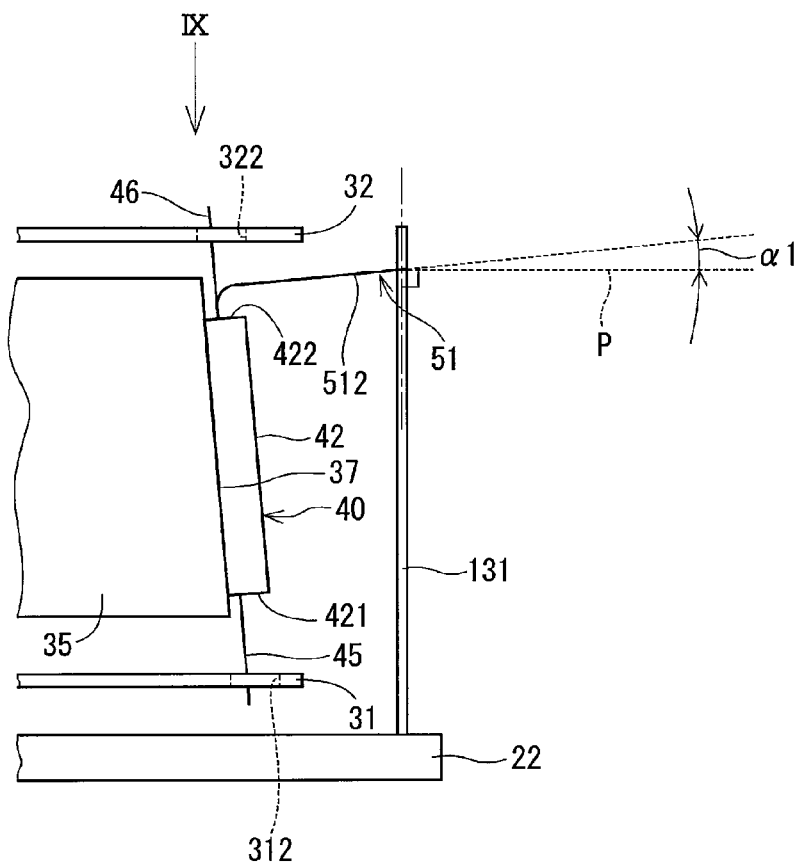
FIG. 8 is a side view of a connecting position of the motor terminal and the motor wire in a second embodiment of the present disclosure.
Figure 9:
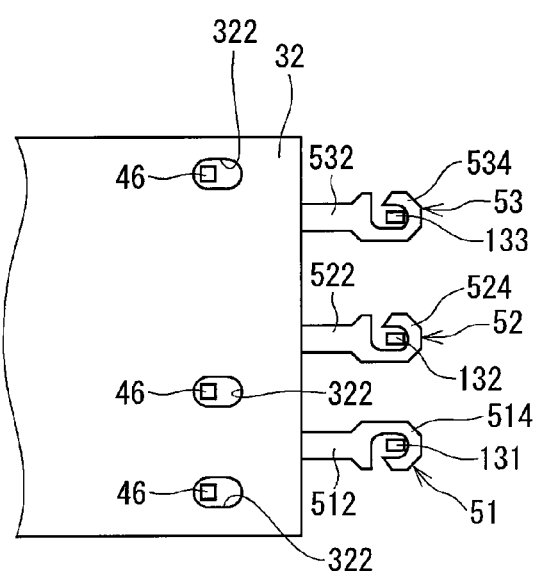
FIG. 9 is an illustration of a view along an arrow IX in FIG. 8.

The driver device in the second embodiment of the present disclosure is shown in FIGS. 8 and 9. FIGS. 8 and 9 correspond to FIGS. 4 and 5 of the first embodiment. In FIG. 8, the motor terminal 53 and the motor wire 133 are omitted. The same applies to the other embodiments.

In the present embodiment, the module mounting surface 37 of the heat sink 35 is tilted, so that a motor 10 side end of the surface 37 is radial-outside than an opposite side end of the surface 37 relative to the rotational center axis S of the motor 10. That is, a distance between the motor 10 side ends of the surface 37 is greater than a distance between the opposite side ends of the surface 37. Thereby, when the heat sink 35 is manufactured by die-casting, the heat sink 35 can be appropriately extracted from a metallic mold, and additional processes, e.g. cutting the burr, become unnecessary.

Further, even when the module mounting surface 37 is tilted against the rotational center axis S (i.e., angled relative to the rotational center axis S), the module mounting surface 37 still "rises" from the one axial end of the motor 10 (substantially perpendicularly), and thus the semiconductor module 40 is arranged/held vertically against the motor 10.

The power board 32 has a power terminal connection hole 322 disposed thereon. The power terminal connection hole 322 is bored at the power terminal protrusion position at which the power terminal 46 protrudes and from which it extends.

In the present embodiment, since the module mounting surface 37 is tilted, the power terminal 46 is inserted un-perpendicularly into the power terminal connection hole 322. Therefore, dimension of the power terminal connection hole 322 is longer, in FIG. 9, in the horizontal/lateral direction than in the vertical direction. In other words, the dimension of the hole 322 along the direction of tilt of the power terminal 46, with respect to a rotational center axis (S) of the motor section, is longer than the dimension of the hole 322 along the direction perpendicular to the direction of tilt. Thus, the hole 322 substantially has an elliptical shape.

Further, a controller terminal connection hole 312 bored on the controller board 31 has, just like the power terminal connection hole 322, a substantially elliptical shape, whose longer axis extends along the direction of tilt of the module mounting surface 37.

In the present embodiment, the controller terminal connection hole 312 and the power terminal connection hole 322 are respectively formed to have an elliptical shape, in which the dimension of the holes along the direction of tilt of the terminals is greater than the dimension of the holes along the perpendicular-to-direction of tilt of the terminals. Thereby, even when the controller terminal 45 is tilted against the controller board 31 (i.e., angled relative to a direction perpendicular the controller board 31), an insertion of the controller terminal 45 into the controller terminal connection hole 312 is easy. Similarly, even when the power terminal 46 is tilted against the power board 32, an insertion of the power terminal 46 into the power terminal connection hole 322 is easy. Thus, the assemblability of those components is improved.

In addition, the same effects as the above-mentioned embodiment are also achieved.

In the present embodiment, the controller terminal connection hole 312 and the power terminal connection hole 322 correspond to a "terminal connection hole" in the claims.

(Third Embodiment)

Figure 10:
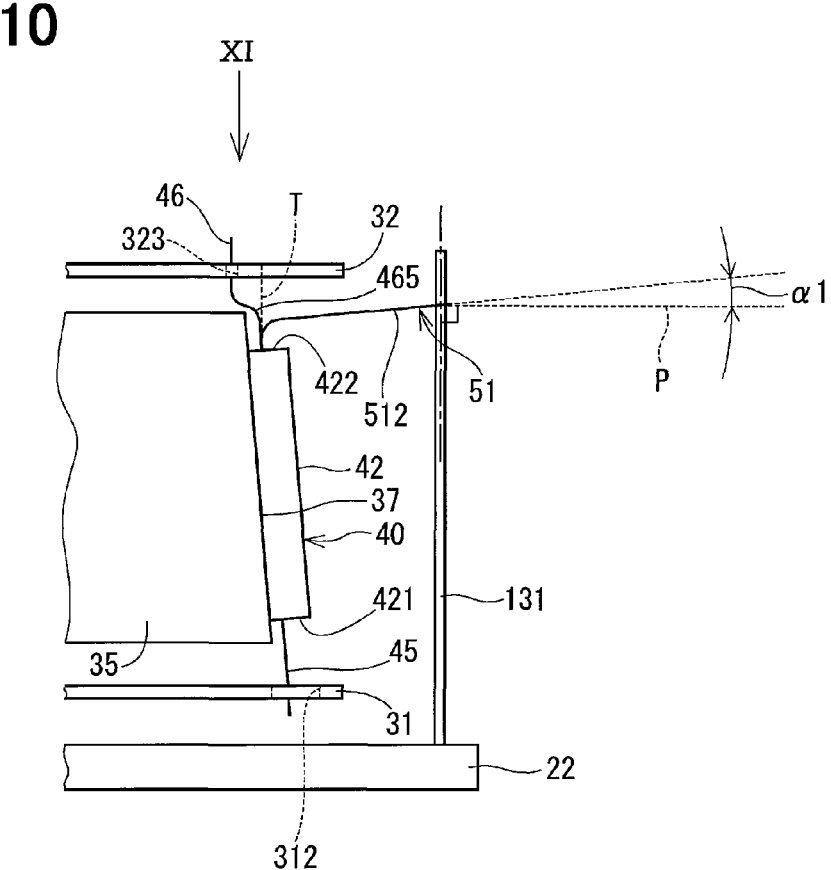
FIG. 10 is a side view of a connecting position of the motor terminal and the motor wire in a third embodiment of the present disclosure.
Figure 11:
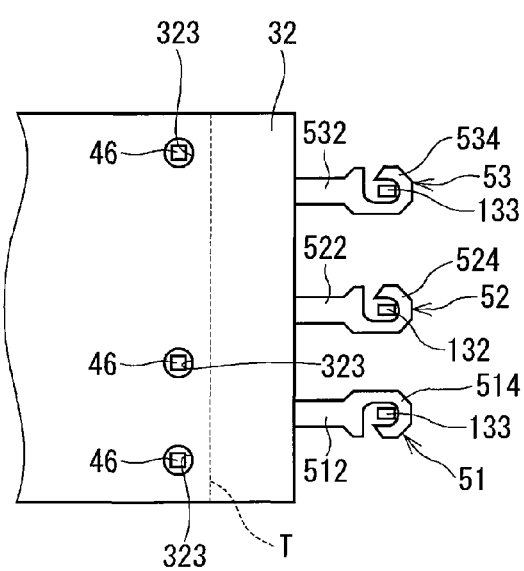
FIG. 11 is an illustration of a view along an arrow XI direction in FIG. 10.

The driver device in the third embodiment of the present disclosure is shown in FIGS. 10 and 11.

FIGS. 10 and 11 are correspond to FIGS. 4 and 5 of the first embodiment, and, since the power terminal 46 and the power terminal connection hole 322 differ from the ones of the first embodiment in the present embodiment, they are the focus of the description in the present embodiment.

A power terminal connection hole 323 bored on the power board 32 is positioned at an inside of the terminal protrusion position T where the power terminal 46 protrudes from the molded body 42. The power terminal connection hole 323 of the present embodiment takes an approximate circular shape.

When the power terminal 46 is divided into two sides, i.e., a tip side of the terminal 46 and a mold side of the terminal 46 that are connected by a bent portion 465, the power terminal 46 bent at the bent portion 465 puts the tip side of the terminal 46 closer to the heat sink 35 relative to the mold side of the terminal 46. The position closer to the heat sink 35 described above means an "inside," or a radial inward of the motor 10, as shown in FIG. 10.

In the present embodiment, the bent portion 465 allows the tip side of the terminal 46 to rise perpendicular against the power board 32, so that the tip side of the terminal 46 is insertable into the power board 32. Thus, the ease of assembly for inserting the power terminal 46 into the power terminal connection hole 323 is realized, thereby improving the assemblability of the driver device. Further, the power terminal connection hole 323 can be positioned on an inside of the power terminal protrusion position, thereby contributing to the size reduction of the power board 32 and the size reduction of the entire apparatus.

In the present embodiment, since the tip side of the power terminal 46 stands perpendicular to the power board 32, the power terminal connection hole 323 has a substantially circle shape, just like the second embodiment. Even in such configuration, the size reduction of the power board 32 is realized.

Further, the same effects as the above-mentioned embodiments also achieved.

In the present embodiment, the power terminal connection hole 323 corresponds to a "terminal connection hole."

In the present embodiment, although the controller board 31 and the controller terminal 45 are configured in the same manner as the ones of the second embodiment, the controller terminal connection hole 312 may be positioned on an inside of the controller terminal protrusion position, which is similar to the arrangement of the power board 32 and the power terminal 46, and the controller terminal 45 may have the bent portion just like the power terminal 46. In such case, the controller terminal connection hole 312 may have a substantially circle shape, just like the power terminal connection hole 323.

(Fourth Embodiment)

Figure 12:
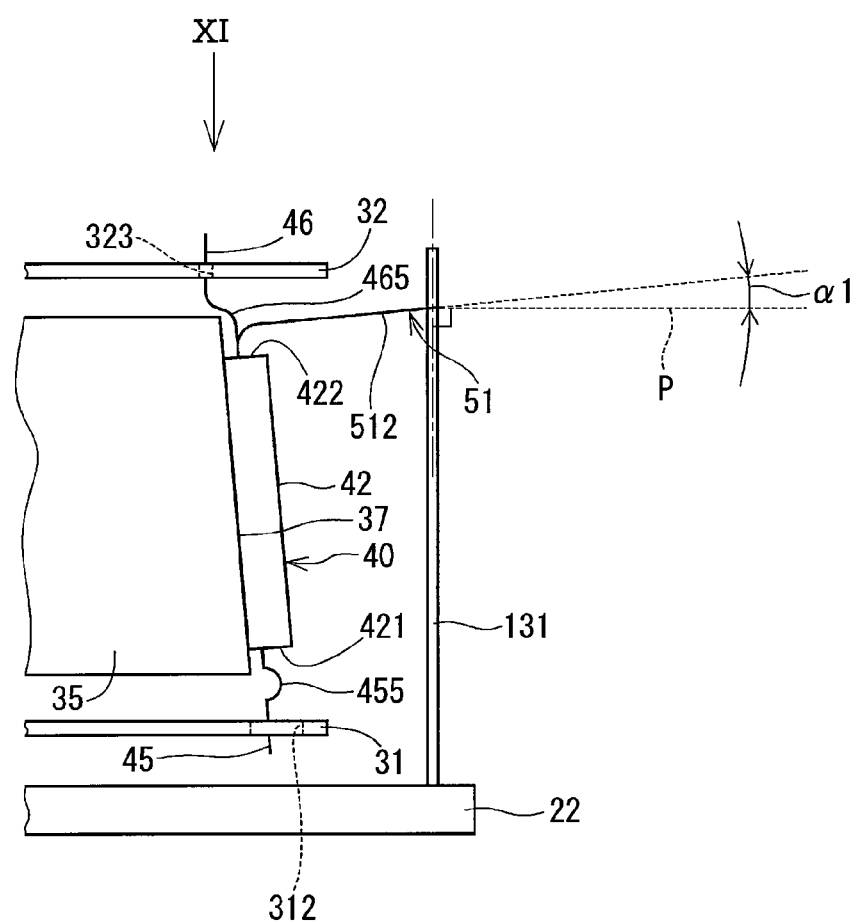
FIG. 12 is a side view of a connecting position of the motor terminal and the motor wire in a fourth embodiment of the present disclosure.

The driver device in the fourth embodiment of the present disclosure is shown in FIG. 12.

The fourth embodiment is a modification of the third embodiment, and, since the controller terminal 45 is different from the one in the third embodiment, the controller terminal 45 is the focus of the description in the present embodiment.

The controller terminal 45 of the present embodiment has an arc part 455 that is bent circularly. By having the arc part 455 formed in such manner, the controller terminal 45 is easily insertable into the controller terminal connection hole 312, and the assemblability of those components is improved. Further, the stress applied to the solder-joint part is mitigated.

Furthermore, a tip side of the arc part 455 may be formed to be perpendicular to the controller terminal connection hole 312 of the controller board 31, and the controller terminal connection hole 312 may have an approximate circle shape. In this case, the arc part 455 corresponds to a "bent portion."

By having such a configuration, the same effects are achieved as the other embodiments.

(Other Embodiments)

(a) According to the above-mentioned embodiments, two semiconductor modules are disposed on both sides of the heat sink. In other embodiments, the number of semiconductor modules may be not only two but may be three or more, i.e., any number.

(b) As for the semiconductor module of the above-mentioned embodiments, the six switching elements are molded in one body. In other embodiments, the number of switching elements may be not only six but any number. In addition to the switching element, the other electronic components such as a power relay, a motor relay, as well as a shunt resistor may be molded in one body.

(c) According to the above-mentioned embodiments, three the motor terminals are provided in the semiconductor module. In other embodiments, the number of the motor terminals provided in one semiconductor module may be not only three but any number.

Further, the motor terminal 53 in the above-mentioned embodiment is different from other motor terminals 51 and 52 in its length. In other embodiments, all motor terminals may have the same length, or all motor terminals may have respectively different lengths.

(d) According to the above-mentioned embodiment, the terminal angle α3 is configured to have a greater/wider angle than the terminal angles α1 and α2. In other embodiments, regardless of the length of the motor terminal, the terminal angles may be all the same.

Further, in other embodiments, the terminal angle which is an angle between the extension region of each of the all motor terminals and the motor wire may also be configured to be greater/wider than 0 degrees. In other embodiments, for example, the terminal angle between the extension region of the shortest motor terminal and the motor wire may be configured to be greater than 0 degrees, and the terminal angles between the extension regions of other motor terminals and the motor wires may be configured to be equal to 0 degrees. In other words, as long as at least one terminal angle is greater than 0 degrees, the terminal angles of other motor terminals may be equal to 0 degrees.

(e) According to the above-mentioned embodiments, the notch formed in the connection portion is formed on an outside thereof. In other embodiments, the notch may be formed not only on the outside but also at any part/portion. Further, the notch may be omitted.

(f) According to the above-mentioned embodiment, the motor wire perpendicularly extends out from the motor. In other embodiments, the motor wire extending out from the motor may be tilted relative to the axis of the rotor 14. For example, since the length of the motor terminal is increased when the motor wire is tilted away from the module mounting surface of the heat sink, i.e., when tiltingly extended from the motor (extending at an angle away from the motor), the solder dislocation amount at the connection portion is reduced, thereby providing a longer life span for the solder-joint part.

In the above-mentioned embodiment, the cross section of the motor wire is provided as a square wire which has a quadrangular shape. In other embodiments, the motor wire may have any cross section shape, e.g. a circular cross section, or the like.

(g) According to the above-mentioned embodiments, the controller board and the power board are provided. In other embodiments, various boards may be provided as long as various kinds of boards are provided as single board. That is, the number of the boards disposed in the motor controller may be any number.

Further, in the above-mentioned embodiment, the controller terminal connection hole on the controller board and the power terminal connection hole on the power board have a circular shape, or an elliptical shape. In other embodiments, the holes on those boards may have any shape.

Figure 13:
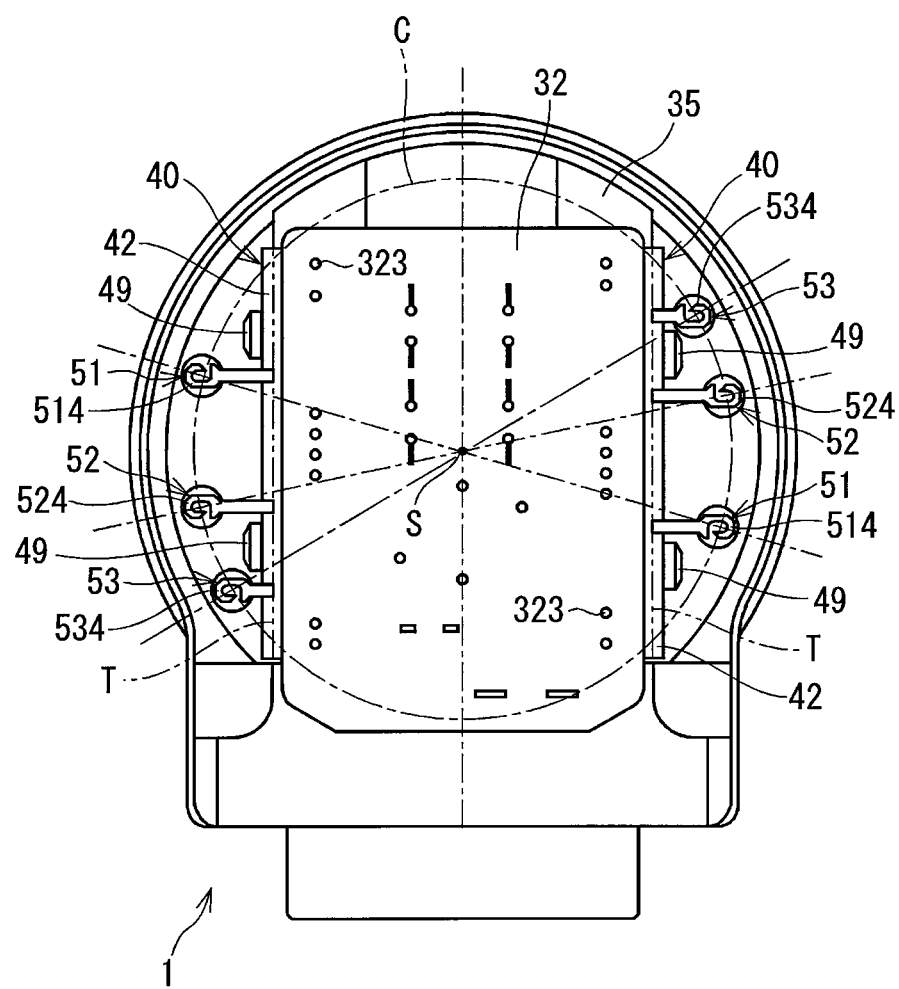
FIG. 13 is a plan view of the driver device in an other embodiment of the present disclosure.

According to the above-mentioned embodiment, an outer periphery of the power board is positioned on an outside relative to the power terminal protrusion position. In other embodiments, especially when the bent portion is provided in the power terminal as described in the third embodiment, the outer periphery of the power board may be positioned on an inside relative to the terminal protrusion position T, as shown in FIG. 13. In such manner, the entire apparatus may have a smaller volume. The same applies to the controller board.

(h) According to the above-mentioned embodiment, the driver device is applied to an electric power steering device. In other embodiments, a driver device may be applied to other devices other than the electric power steering device.

Although the present disclosure has been fully described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined in the appended claims.

What is claimed is:

1. A driver device comprising:
    a motor section having a stator, a winding wire wound on the stator, and a rotor rotatably disposed relative to the stator;
    a motor wire extending out from an axial end of the motor section and connected to the winding wire;
    a semiconductor module having a switching element that switches an electric power supply to the winding wire, a molded body having the switching element disposed therein, and a motor terminal projecting from the molded body and connected to the motor wire; and a heat sink disposed on the axial end of the motor section, the heat sink having a module mounting surface that extends in an axially outward direction from the axial end of the motor section, the semiconductor module being disposed on the module mounting surface, wherein the motor terminal includes (i) a base region on a molded body side of a bend location, and (ii) an extension region on a tip side of the bend location, the extension region having a connection portion with an insertion hole into which the motor wire is inserted, the extension region of the motor terminal is angled relative to a perpendicular line that is perpendicular to the motor wire to form a terminal angle that is equal to or greater than zero degrees, the semiconductor module has a plurality of motor terminals, and when a distance between (a) a protrusion position of a first motor terminal, among the a plurality of motor terminals, at which the first motor terminal protrudes from the molded body and (b) the motor wire that is connected to the first motor terminal is smaller than a distance between (c) a protrusion position of a second motor terminal at which the second motor terminal protrudes from the molded body and (d) the motor wire that is connected to the second motor terminal, the terminal angle of the first motor terminal is greater than the terminal angle of the second motor terminal.

2. The driver device of claim 1, wherein when the terminal angle of the first motor terminal is set to be within a predetermined range, a projection area of the insertion hole along a motor wire extending direction is greater than a cross sectional area of the motor wire that is connected to the first motor terminal.

3. The driver device of claim 1, wherein the connection portion is positioned on a concentric circle that is concentric to an outer shape of the motor section and centered on a rotational center axis of the motor section.

4. The driver device of claim 1, wherein the semiconductor module is disposed on multiple sides of the heat sink, and the connection portions are symmetrically positioned around a rotational center axis of the motor section.

5. The driver device of claim 1, wherein the module mounting surface is tilted with respect to a rotational center axis of the motor section.

6. The driver device of claim 1, wherein the module mounting surface is parallel with a rotational center axis of the motor section.

7. The driver device of claim 1, further comprising:

a board, wherein the board is fixedly disposed on a side of the heat sink facing the motor section side or on a side of the heat sink facing away from the motor section side, and has a terminal connection hole into which a board terminal that extends from the molded body of the semiconductor module is inserted.

8. The driver device of claim 7, wherein the terminal connection hole is configured such that a dimension of the hole that is measured along a direction of tilt of the board terminal with respect to a rotational center axis of the motor section is greater than a dimension of the hole measured along a direction that is perpendicular to the direction of tilt.

9. The driver device of claim 7, wherein the terminal connection hole has a circular shape.

10. The driver device of claim 7, wherein the board terminal has a bent portion that is bent to have a tip side of the terminal positioned on a heat sink side of the molded body.

* * * * *